United States Patent
Reusing

(10) Patent No.: US 7,726,038 B2
(45) Date of Patent: Jun. 1, 2010

(54) GUIDE RAIL WITH AN ABSOLUTE DIMENSIONAL STANDARD

(75) Inventor: Guenter Reusing, Niederwerrn (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 12/202,530

(22) Filed: Sep. 2, 2008

(65) Prior Publication Data
US 2009/0064523 A1 Mar. 12, 2009

(30) Foreign Application Priority Data
Sep. 7, 2007 (DE) .................. 10 2007 042 796

(51) Int. Cl.
G01D 5/347 (2006.01)
G01B 7/00 (2006.01)

(52) U.S. Cl. .................. 33/706; 33/707; 33/708

(58) Field of Classification Search ........... 33/706–710, 33/1 M
See application file for complete search history.

(56) References Cited

U.S. PATENT DOCUMENTS

| 5,563,408 | A | 10/1996 | Matsumoto et al. | |
|---|---|---|---|---|
| 6,564,468 | B2 * | 5/2003 | Blattner et al. | 33/706 |
| 6,611,138 | B2 | 8/2003 | Vasiloiu | |
| 6,769,195 | B2 * | 8/2004 | Huber et al. | 33/706 |
| 6,912,797 | B2 * | 7/2005 | Rodi | 33/707 |
| 6,922,907 | B2 * | 8/2005 | Rodi | 33/707 |
| 6,976,317 | B2 | 12/2005 | Rodi | |
| 7,091,473 | B2 | 8/2006 | Rodi | |
| 2002/0017902 | A1 | 2/2002 | Vasiloiu | |
| 2002/0129508 | A1 * | 9/2002 | Blattner et al. | 33/706 |
| 2002/0170200 | A1 * | 11/2002 | Rodi | 33/707 |
| 2004/0020067 | A1 * | 2/2004 | Matsumoto | 33/706 |
| 2004/0093754 | A1 * | 5/2004 | Rodi | 33/707 |
| 2004/0163270 | A1 * | 8/2004 | Reusing et al. | 33/706 |
| 2004/0168333 | A1 * | 9/2004 | Mauerberger et al. | 33/707 |
| 2004/0183002 | A1 | 9/2004 | Rodi | |
| 2007/0186431 | A1 * | 8/2007 | Mittmann et al. | 33/707 |

FOREIGN PATENT DOCUMENTS

| DE | 42 44 178 | 7/1994 |
|---|---|---|
| DE | 196 14 410 | 10/1997 |
| DE | 103 12 045 | 9/2004 |
| DE | 20 2004 020 155 | 3/2005 |
| DE | 20 2006 018 016 | 3/2007 |
| EP | 0 557 608 | 9/1993 |
| EP | 1 052 480 | 11/2000 |
| EP | 1 164 358 | 12/2001 |

* cited by examiner

*Primary Examiner*—Yaritza Guadalupe-McCall
(74) *Attorney, Agent, or Firm*—Michael J. Striker

(57) ABSTRACT

A guide rail for a linear bearing has a longitudinal axis, a first and second diametrically opposed lateral surface and a top lateral surface, running surfaces provided on the first and/or second lateral surfaces and extending parallel to the longitudinal axis, for a guide carriage of the linear bearing, and an incremental dimensional standard for a position measuring device provided on one of the lateral surfaces, wherein an absolute dimensional standard is provided on another lateral surface, which is scanable by the position measuring device together with the incremental dimensional standard in order to determine an absolute position.

12 Claims, 3 Drawing Sheets

GUIDE RAIL WITH AN ABSOLUTE DIMENSIONAL STANDARD

CROSS-REFERENCE TO A RELATED APPLICATION

The invention described and claimed hereinbelow is also described in German Patent Application DE 10 2007 042 796.6 filed on Jul. 9, 2007. This German Patent Application, whose subject matter is incorporated here by reference, provides the basis for a claim of priority of invention under 35 U.S.C. 119(a)-(d).

BACKGROUND OF THE INVENTION

The present invention relates to a guide carriage for a linear bearing.

A guide rail for a linear bearing is made known in EP 1 052 480 A1. FIG. 1 of that publication shows a linear bearing, which is composed of a guide rail 3 and a guide carriage 7. The guide carriage is movably supported on the guide rail by four rows of rolling elements 21. To this end, the guide rail includes running surfaces 23 for the rolling elements on its diametrically opposed lateral surfaces. An incremental dimensional standard 29 for a position measuring device is provided on a lateral surface. The dimensional standard is formed by a metal strip, which is provided with a large number of similar, periodically located openings. A sensor 31 for scanning the dimensional standard is provided on the guide carriage.

Reference marks are also provided on the guide rail, in order to specify absolute positions, which serve as starting points for the position determination. The reference marks are designed as separate recesses 41 in the incremental dimensional standard, or as bore holes 41' in the guide rail. In order to determine the absolute position of the linear roller bearing, the guide carriage must be moved—after the position measuring device has been started up—until the reference sensor detects a reference mark. With each subsequent motion of the guide carriage, the absolute position may be ascertained by adding the change in length—which is determined using the incremental dimensional standard—to the absolute position of the reference mark, with appropriate consideration for the sign.

Publication U.S. Pat. No. 5,563,408 makes known a further position measuring device with an incremental dimensional standard. Instead of the reference marks, a separate, absolute dimensional standard is used, which is located in parallel with the incremental dimensional standard on a single, combined dimensional standard. The absolute dimensional standard is provided with a chain code, i.e., a bit sequence, with which a predetermined number of adjacent bits results in an identification that occurs in only one position of the chain code. A predetermined absolute position of the position measuring device is therefore assigned to each identification. The bits of the identification are read by several adjacent sensors, so that the position measuring device may ascertain its absolute position after start-up, without changing its position.

It should be pointed out that an incremental dimensional standard makes it possible to perform position determination in a substantially more accurate manner than is possible with an absolute dimensional standard, since it uses an interpolation method in combination with the same separation. For example, with an incremental dimensional standard with a separation of 1 mm, the position may be determined exactly up to 0.001 mm. An interpolation method of this type is also disclosed in U.S. Pat. No. 5,563,408. According to FIG. 2, a separation period of the incremental dimensional standard is subdivided into eight parts.

To ensure that the incremental and absolute dimensional standards interact flawlessly, they must have the same separation that is exactly synchronous across the entire length of the dimensional standard, thereby ensuring that an absolute marking is unequivocally assigned to every incremental marking. This exact synchronization may only be attained, in a cost-favorable manner, when the absolute and incremental dimensional standards are designed as single pieces, as a combined dimensional standard.

SUMMARY OF THE INVENTION

The object of the present invention is to utilize the mode of operation of U.S. Pat. No. 5,563,408 for the linear roller bearing disclosed in EP 1 052 480 A1 or comparable linear roller bearings, such as cam roller guides or linear sliding bearings, so that they do not need to be moved after start-up, to determine the absolute position the first time. A problem occurs, namely that the dimensional standard described in EP 1 052 480 A1 may not be replaced directly with the dimensional standard described in U.S. Pat. No. 5,562,408, because the guide rail does not provide enough space for this. A linear bearing is a standard component, the outer dimensions of which may not be easily changed. At the same time, the ratio of the width to the separation of the incremental dimensional standard is a decisive factor in terms of the accuracy of the position determination. If the width of the incremental dimensional standard would be reduced so that the absolute dimensional standard would have sufficient space, the accuracy of the position measuring device would be reduced considerably.

To solve this problem, it is therefore provided that an absolute dimensional standard is provided on another lateral surface, which may be scanned by the position measuring device together with the incremental dimensional standard, in order to determine an absolute position. In this manner, it is possible to continue using the existing incremental dimensional standard as it is, which means that the accuracy of the position measuring device is not diminished.

Particularly preferably, the incremental and absolute dimensional standards are located on the first and/or second lateral surface(s) of the guide rail. The lateral surfaces of the guide rail are typically processed in a particularly accurate manner, since they are ground along with the running surfaces located there, or they are finely machined in another manner. As a result, the two separate dimensional standards may be oriented relative to each other in a particularly accurate manner.

It may be provided that the absolute and incremental dimensional standards are formed by metal strips that include openings for use to make position markings. The use of metal strips with openings has the advantage that they may be manufactured very accurately using a photochemical etching method. In addition, metal strips may be stretched elastically by small amounts in order to accurately adjust the desired separation. In this case, it is also possible to easily install the two metal strips in such a manner that the separations of the two dimensional standards are oriented relative to each other with the required level of accuracy across the entire length of the guide rail. Any small dimensional errors may be easily compensated for by stretching the metal strips differently.

With the latter embodiment, it has proven particularly advantageous to design the incremental and absolute dimensional standards to be separate, since the periodic, incremental dimensional standard may be manufactured with much greater accuracy than the aperiodic, absolute dimensional standard may be. This may be explained via the uneven changes in length that the absolute dimensional standard undergoes when it is stretched. In addition, internal tensions in the raw material of the dimensional strip may result in a distortion due to the openings being unevenly spaced. These problems do not occur with a uniform incremental dimensional strip. They would occur, however, if the one-pieced dimensional standard described in U.S. Pat. No. 5,563,408 would be designed as a metal strip with openings. A dimensional standard of this type could never attain the measurement accuracy of the separate incremental dimensional standard according to the present invention.

It may also be provided that the absolute dimensional standard includes an absolute track and a synchronous incremental track. With this embodiment, a dimensional standard is therefore used that has the design, from the start, that is known from U.S. Pat. No. 5,563,408. The dimensional standard may have a relatively low accuracy. The error in the position determination only need be smaller than the separation of the incremental dimensional standard, so that every incremental position marking may be unambiguously identified. Due to the lower accuracy requirements, it is now possible to locate the incremental track and the absolute track of the absolute dimensional standard on a lateral surface of the guide rail, since they may be designed with a correspondingly narrow width.

The separation of the absolute dimensional standard is preferably a whole-number multiple of the separation of the incremental dimensional standard, the separations of both dimensional standards being essentially synchronous across the entire length of the guide rail. As a result, there is no need to provide complex look-up tables in the evaluation device of the position measuring device, in which an incremental position marking is assigned to every absolute position ascertained with the absolute dimensional standard. In addition, any guide rail may be combined with any evaluation device, without the need to perform a separate calibration procedure in order to ascertain the aforementioned look-up tables. As a result, within the framework of the series production of the inventive position measuring device, the cost disadvantages are more than compensated for due to the orientation of the incremental and absolute dimensional standard. The expression "essentially synchronous" used above means that the two dimensional standards are so exactly synchronous that it is ensured that the absolute position determined with the absolute dimensional standard may be assigned unambiguously to a certain incremental marking.

It may also be provided that the absolute dimensional standard is composed of several separate subsections in the direction of the longitudinal axis. In this manner, the manufacture of the absolute dimensional standard may be greatly simplified, since the relatively long but aperiodic dimensional standard may be manufactured using several small tools that have been adapted to the particular subsections. This is much more cost-favorable than using a single large tool. With a dimensional standard designed as a metal strip in which openings are formed using a photochemical etching method, it is possible to use several short exposure masks instead of one large mask. It should also be noted that guide rails may have lengths of 6 m or more. Exposure masks for absolute dimensional standards with these lengths are no longer available today.

The absolute track preferably includes a chain code with a bit code, with which a predetermined number of adjacent bits forms an identification, and with which the identifications of the chain codes of the various subsections of the absolute dimensional standard are not the same. It must also be ensured that all subsections of the absolute dimensional standard have different designs, to ensure that an unambiguous absolute position determination may be carried out.

It may also be provided that the metal strip of the absolute dimensional standard has a higher electrical conductivity or a higher magnetic susceptibility than does the metal strip of the inductive dimensional standard. The inventive metal strips are typically scanned with the aid of alternating electromagnetic fields, which induce eddy currents in the metal strips. The intensity of the eddy currents may be influenced by the proposed openings in the metal strip, which may be detected by a sensor that reacts to the alternating electromagnetic field of the eddy currents. It is clear that a high electrical conductivity of the metal strip results in very strong eddy currents, which, in turn, cause the sensor signal to become stronger. Materials with high conductivity, such as copper or aluminium, are typically relatively expensive, however, and have low mechanical stiffness. In addition, welding them together with the steel guide rail is very difficult or impossible. Steel is therefore also typically used as the material for the metal strip of the inductive dimensional standard, with the lower conductivity being compensated for by the use of several sensors, whose signals are added. This is easily possible with the incremental dimensional standard due to its periodic structure, since the majority of sensors may scan adjacent identical openings in the metal strip. With the aperiodic, absolute dimensional standard, it is not possible, however, to amplify the signal by using several standards, since it does not include repeating structures that could be scanned using parallel sensors. Accordingly, it is reasonable to use a metal strip with greater electrical conductivity or a higher magnetic susceptibility for the absolute dimensional standard than for the incremental dimensional standard.

The lower stiffness of the absolute dimensional standard may be compensated for by bonding it with a body of the guide rail. As a result, the metal strip is stabilized to the point that its low stiffness is no longer a disruption. In contrast, the incremental dimensional standard is preferably mounted to the guide rail in the manner known from EP 1 052 480 A1 by welding it via both ends to the guide rail such that it is under tensile stress.

The inventive guide rail is preferably used in a linear bearing, with the guide carriage—which is movably supported on the running surfaces of the guide rail—being provided with at least one incremental sensor for scanning the incremental dimensional standard, and with at least one absolute sensor for scanning the absolute dimensional standard.

Guide rails for linear bearings are typically manufactured in finite lengths of, e.g., 6 m. For applications in which a longer guide rail is required, several separate rail pieces are therefore abutted with each other. At the points of contact of the guide rails, it must be ensured that the absolute sensor and the incremental sensor always scan the same rail piece, since it is not possible to ensure the required synchronization of the absolute and incremental dimensional standard beyond a rail abutment. This problem may be solved by providing an absolute sensor and an incremental sensor essentially in the same longitudinal position on the guide carriage.

The two sensors are preferably located in an end region of the guide carriage, so that they may be combined in one separate assembly that may be installed on a series-production guide carriage that is not prepared in any special way for the position measuring device. It may also be provided that an absolute sensor and an incremental sensor are provided on both end regions of the guide carriage, so that at least one pair of sensors is always located entirely next to the abutment when a rail abutment is traveled across.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
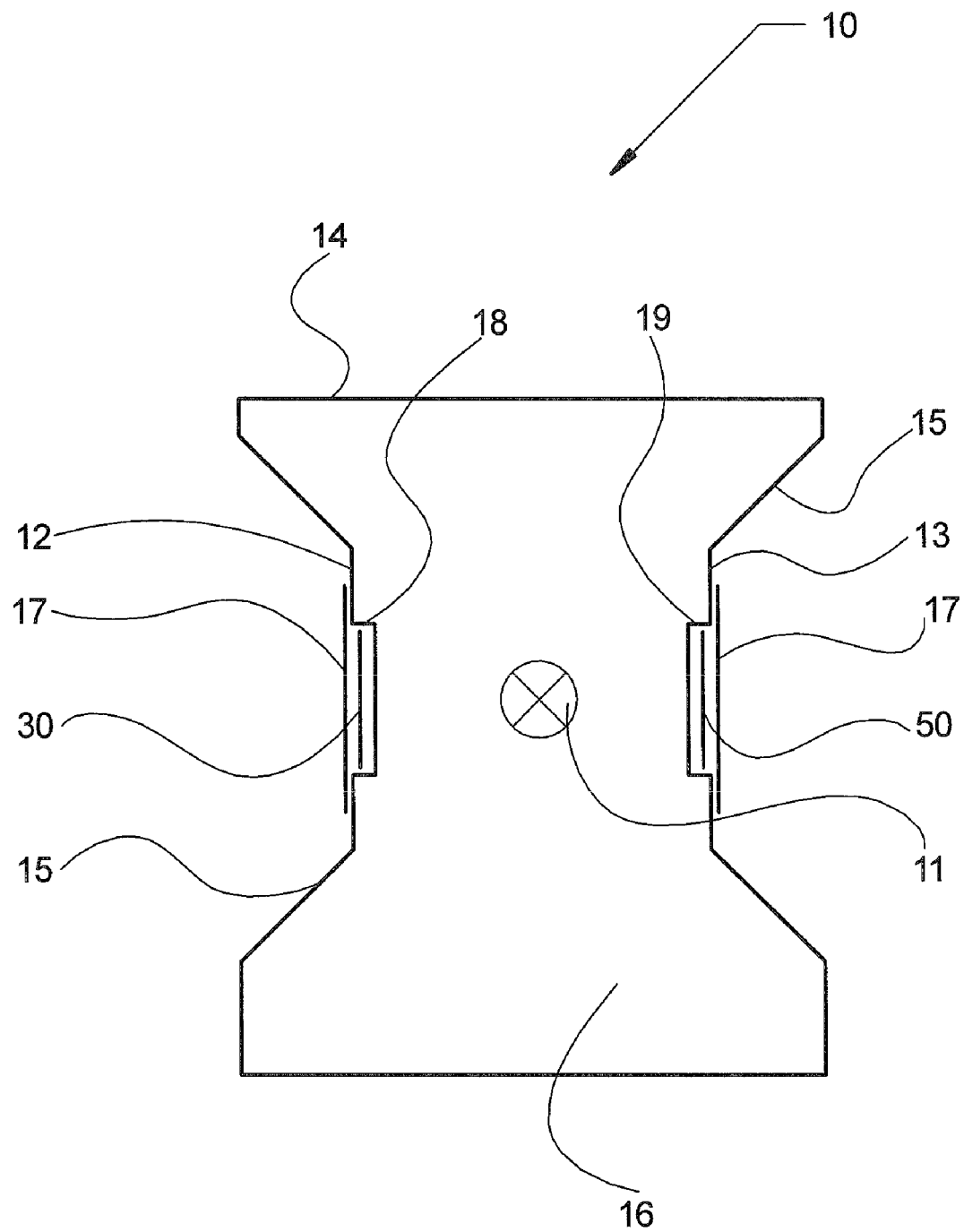
FIG. 1 shows a basic schematic cross section of an inventive guide rail.

An inventive guide rail is labelled in general with reference numeral 10 in FIG. 1. This is the guide rail of a linear roller bearing that uses rollers as the rolling elements. Guide rail 10 includes a first and second diametrically opposed lateral surface 12, 13 and a top lateral surface 14. Two flat running surfaces 15 for the rolling elements are provided on the first and second lateral surfaces 12, 13, which extend in parallel with longitudinal axis 11 of guide rail 10. Guide carriage 71 of assigned linear bearing 70 (see FIG. 5) is therefore supported in a linearly movable manner on guide rail 10 relative to all transverse directions. Longitudinal axis 11 of the guide rail is typically a straight line; longitudinal axes 11 that are curved in sections are also feasible, however.

A first recess 18 for accommodating incremental dimensional standard 30 and a second recess 19 for accommodating absolute dimensional standard 50 are provided between running surfaces 15. In accordance with the embodiment shown in FIG. 2 of EP 1 052 480 A1, recesses 18, 19 are closed with a cover strip 17, which is laser-welded across its entire length with body 16 of guide rail 10. The cover strip is a metal strip that is approximately 0.1 mm thick and is made of stainless, non-magnetizable steel.

Figure 2:
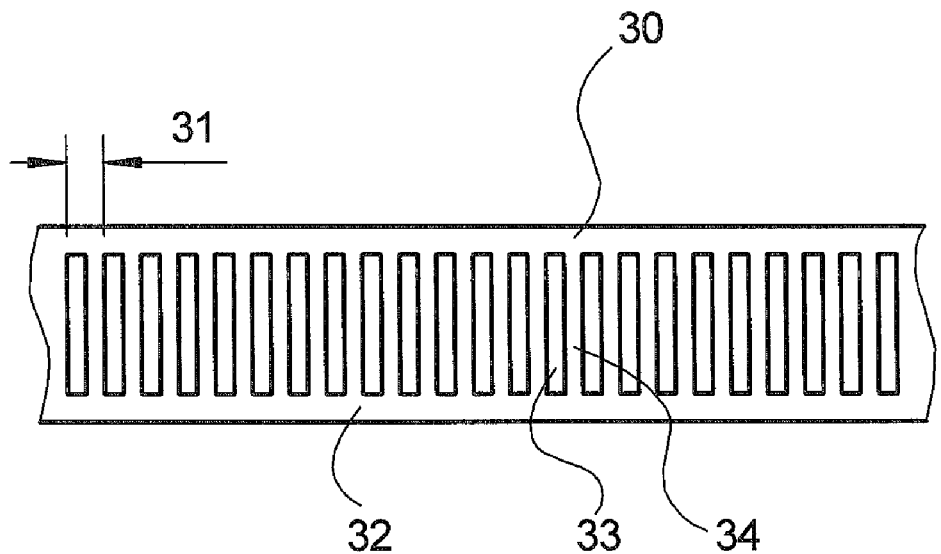
FIG. 2 shows a front view of the incremental dimensional standard of the guide rail in FIG. 1.

Incremental dimensional standard 30 is designed as a metal strip 32 made of magnetizable steel with rectangular openings 33 (see FIG. 2). Openings 33 are identical across the entire length of metal strip 32. They are created using a photochemical etching procedure. The width of segments 34 and the width of openings 33 are both 0.5 mm, therefore resulting in a separation 31 of 1 mm. The height of openings 33 is substantially greater than their width.

Figure 4:
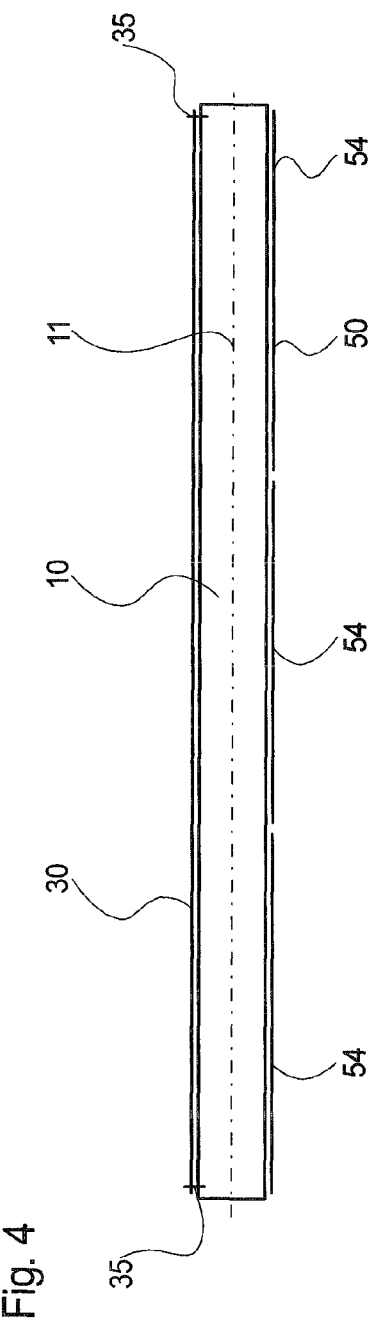
FIG. 4 shows a basic schematic top view of the guide rail in FIG. 1.

According to EP 1 052 480 A1, the incremental dimensional standard is spot-welded with body 16 of the guide rail only at its ends, at attachment points 35 (see FIG. 4), and it is stressed such that the separation is exactly 1 mm.

Figure 3:
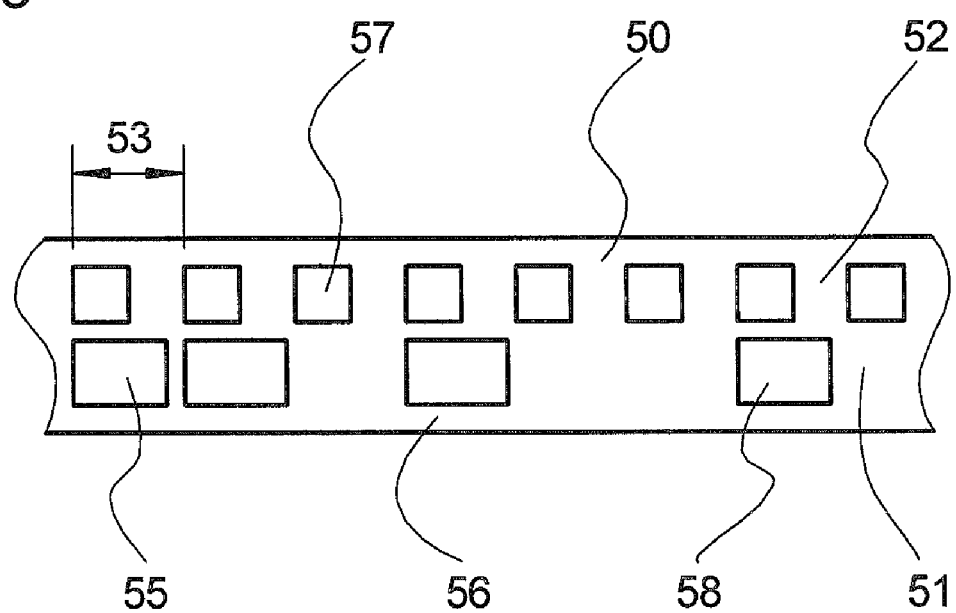
FIG. 3 shows a front view of the absolute dimensional standard of the guide rail in FIG. 1.

Absolute dimensional standard 50 is formed by a metal strip 56 made of copper and that includes several separate subsections 54 (see FIG. 4), which are bonded with body 16 of guide rail 10. According to U.S. Pat. No. 5,563,408, the absolute dimensional standard is designed with an incremental track 51 and an absolute track 52 (see FIG. 3), with the related markings being designed as rectangular openings 57,
58 in metal strip 56. The absolute track contains a chain code, in which thirteen adjacent bits 55 result in an identification that unambiguously defines an absolute position.

Separation 53 of the absolute dimensional standard is 3 mm and is therefore exactly three times as large as separation 31 of the incremental dimensional standard. Incremental track 51 and absolute track 52 are synchronous across the entire length of absolute dimensional standard 50.

Figure 5:
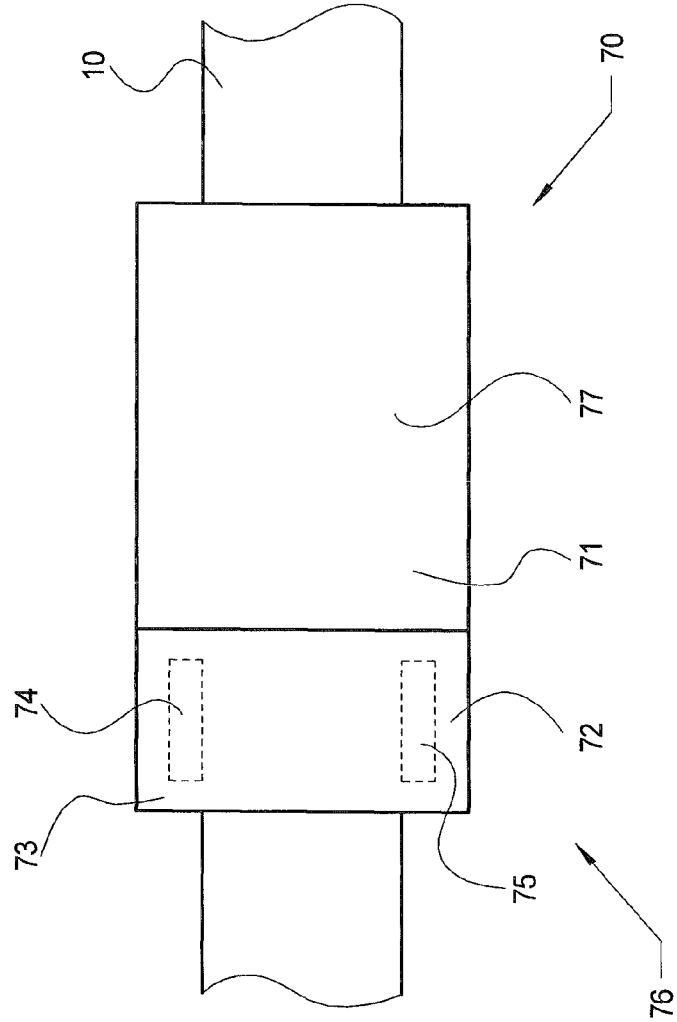
FIG. 5 shows a basic schematic top view of an inventive linear guide.

A linear bearing 70 with inventive guide rail 10 is shown in FIG. 5. Guide carriage 71, which is supported in a linearly movable manner on guide rail 10, includes a measurement head 73, in which an incremental sensor 74 is provided for scanning incremental dimensional standard 30, and in which an absolute sensor 75 is provided for scanning absolute dimensional standard 50. According to DE 20 2006 018 016 U1, measurement head 73 is detachably connected to one end of body 77 of the guide carriage. Incremental sensor 74 is designed per the embodiment shown in FIG. 9 in combination with the embodiment shown in FIG. 15 of EP 1 164 358 B1. The planar coils disclosed in EP 557 608 B1 and the assigned evaluation method are used as absolute sensor 75, the individual planar coils being located on a single substrate, similar to individual sensors S1, S2, E1 through E4 and F1 through F5 of U.S. Pat. No. 5,563,408. All planar coils of the absolute sensor are manufactured simultaneously using a photochemical etching procedure and are therefore oriented relative to each other very accurately.

After position measuring device 76 of linear bearing 70 is switched on, an absolute position is determined based on absolute dimensional standard 50, in accordance with the method presented in U.S. Pat. No. 5,563,408. Based on the separation ratio of 1:3 between the incremental and absolute dimensional standards, this absolute position is assigned to three possible openings 33 in incremental dimensional standard 30. Correct opening 33 may be easily selected using interpolation signals c1 through c3 that are disclosed in U.S. Pat. No. 5,563,408. As operation continues, the position change of the linear bearing is tracked using the incremental dimensional standard, as described in EP 1 164 358 B1. Absolute sensor 75 is therefore deactivated, to save energy.

It will be understood that each of the elements described above, or two or more together, may also find a useful application in other types of constructions differing from the types described above.

While the invention has been illustrated and described as embodied in a guide rail with an absolute dimensional standard, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A guide rail for a linear bearing, having a longitudinal axis; a first and second diametrically opposed lateral surface and a top lateral surface; running surfaces provided on said first and/or second lateral surfaces and extending parallel to the longitudinal axis, for a guide carriage of the linear bearing; and an incremental dimensional standard for a position measuring device provided on one of the lateral surfaces, wherein an absolute dimensional standard is provided on another lateral surface, which is scanable by the position measuring device together with said incremental dimensional standard in order to determine an absolute position.

2. A guide rail as defined in claim 1, wherein said incremental dimensional standard is provided on said first lateral surface, and said absolute dimensional standard is provided on said second lateral surface.

3. A guide rail as defined in claim 1, wherein said absolute dimensional standard and said incremental dimensional standard are configured by metal strips that include openings for use to make position markings.

4. A guide rail as defined in claim 3, wherein said metal strip of said absolute dimensional standard has a higher electrical conductivity or a higher magnetic susceptibility than does said metal strip of said inductive dimensional standard.

5. A guide rail as defined in claim 1, wherein said absolute dimensional standard includes an absolute track and a synchronous incremental track.

6. A guide rail as defined in claim 5, wherein a separation of said absolute dimensional standard is a whole-number multiple of a separation of said incremental dimensional standard, and wherein said separations of both said dimensional standards are essentially synchronous across an entire length of said guide rail.

7. A guide rail defined in claim 1, wherein said absolute dimensional standard is composed of several separate subsections in a direction of the longitudinal axis.

8. A guide rail as defined in claim 7, wherein said absolute track includes a chain code with a bit sequence, with which a predetermined number of adjacent bits forms an identification, and with which the identifications of the chain codes of the various subsections of said absolute dimensional standard do not match.

9. A guide rail as defined in claim 1, wherein said absolute dimensional standard is bonded with a body of said guide rail.

10. A linear bearing, comprising a guide rail including having a longitudinal axis; a first and second diametrically opposed lateral surface and a top lateral surface; running surfaces provided on said first and/or second lateral surfaces and extending parallel to the longitudinal axis, for a guide carriage of the linear bearing; and an incremental dimensional standard for a position measuring device provided on one of the lateral surfaces, wherein an absolute dimensional standard is provided on another lateral surface, which is scanable by the position measuring device together with said incremental dimensional standard in order to determine an absolute position; and the guide carriage which is movably supported on said running surfaces of said guide rail; at least one incremental sensor for scanning the incremental dimensional standard; and at least one absolute sensor for scanning the absolute dimensional standard.

11. The linear bearing as defined in claim 10, wherein said absolute sensor and said incremental sensor are provided in essentially a same longitudinal position on said guide carriage.

12. The linear bearing as defined in claim 11, wherein said absolute sensor and said incremental sensor are provided in an end region of said guide carraige.

\* \* \* \* \*